Jan. 25, 1955  M. WASKIW  2,700,363
VALVE SIGNAL
Filed June 17, 1954
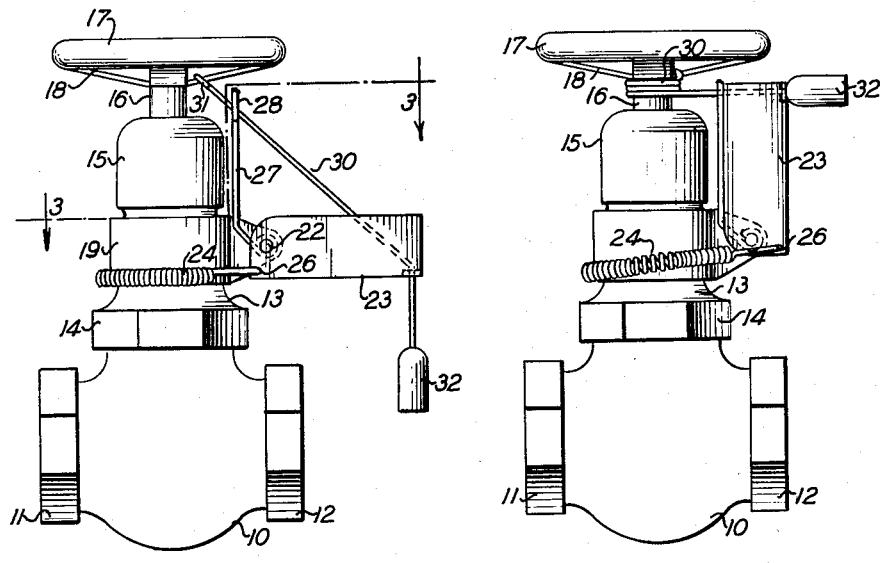
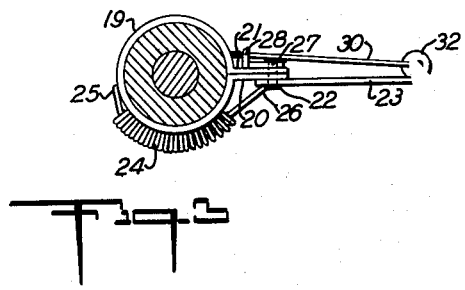
INVENTOR
MICHAEL WASKIW
BY *Herbert J. Jacobi*
ATTORNEY

United States Patent Office 2,700,363
Patented Jan. 25, 1955

2,700,363

VALVE SIGNAL

Michael Waskiw, Linden, N. J.

Application June 17, 1954, Serial No. 437,494

7 Claims. (Cl. 116—125)

This invention relates to valves of the type commonly employed for control of the flow of fluids such as water or gas, and more particularly to an attachment for such valves which serves to indicate at a glance whether the valve is open or closed or in an intermediate position.

Heretofore, numerous types of signals have been proposed for use on valves of the type contemplated by this invention, but the majority of these were not automatic in operation and required adjustment or movement by the operator when opening or closing the valve in order to indicate the position thereof. These prior art devices furthermore would not serve to indicate an intermediate position of the valve, and in the event the operator did not properly adjust or move the signal or indicator, the same would give a false indication.

It is accordingly an object of this invention to provide a valve signal which may be attached to a conventional valve of the globe or gate type, and which is entirely automatic in operation and serves to indicate the open, closed, or intermediate position of the valve.

A further object of the invention is the provision of an automatically operating valve signal which requires no adjustment or manipulation on the part of the operator, and which will automatically provide a true indication of the position of the valve.

A still further object of the invention is the provision of an automatically operating valve signal which may be economically constructed from readily available materials, and conveniently attached to any conventional valve of the globe or gate type without requiring any modification of such valve.

Another object of the invention is the provision of an automatic-operating valve signal which may be conveniently attached to a conventional valve of the globe or gate type, which signal is positive in operation and which in no way interferes with the normal operation of the valve.

Further objects and advantages of the invention will be apparent from the following description, taken in conjunction with the accompanying drawing, wherein:

Fig. 1 is a side elevational view of a valve with the indicator constructed in accordance with this invention attached thereto and showing the valve in open position;

Fig. 2, a side elevational view similar to Fig. 1 but showing the valve in closed position; and Fig. 3, a sectional view on the line 3—3 of Fig. 1.

With continued reference to the drawing, there is shown a valve which may well comprise a body 10 having the usual wrench-engaging portions 11 and 12 at the inlet and outlet thereof, and a bonnet 13 threadedly secured to the body 10. The bonnet 13 may be provided with a wrench-engaging portion 14 to permit the convenient application and removal thereof. Threadedly received on the bonnet 14 is a packing or gland nut 15, through which rotatably extends a valve stem 16, on the upper end of which is fixed a hand wheel 17 for opening and closing the valve. The hand wheel 17 may be provided with spokes 18 as is common in such structures.

The valve signal of this invention may well comprise a strap 19 adapted to be received around the upper portion of the bonnet 13, and strap 19 may be provided with ears 20 and 21 which may be clamped together by screw-threaded fastening means or the like 22 to firmly secure the strap 19 in engagement with the valve bonnet 13. Pivotally mounted on the fastening means 22 is an indicator or flag member 23 which may be of sufficient size to be readily visible from a distance and may, if desired, be of a bright or contrasting color in order that the same may be readily seen and the position thereof noted.

A tension spring 24 may be secured at one end 25 to the strap 19 and at the opposite end 26 to the indicator or flag member 23 at a point below the pivot or fastening means 22. The tension spring 24 operates to urge the flag or indicator member 23 downwardly to a horizontal position as shown in Fig. 1.

Secured to the fastening means 22 or to the strap 19 is an upwardly extending rod 27 provided at the upper end thereof with an eye 28, the purpose of which will be presently described. Also secured to the indicator or flag member 23 adjacent the outer lower edge thereof, is a laterally extending loop 29. A flexible member such as a string or wire or the like 30 may be threaded through the loop 29 and the eye 28 and secured at its upper end 31 to one of the spokes 18 of the hand wheel 17. Of course, if desired the end 31 of the flexible member 30 may be secured to the hand wheel in any desired manner, but preferably this point of securement should be relatively close to the valve stem 16 for a reason which will presently appear. The opposite end of the flexible member 30 serves to support a weight 32 which maintains the flexible member 30 in stretched or tight condition.

As shown in Fig. 1 the valve is open and the indicator or flag member 23 is in the horizontal down position to indicate the open condition of the valve. The indicator or flag member 23 is held in this position by the tension spring 24, and it is to be noted that the weight 32 on the lower end of flexible member 30 is disposed somewhat below the loop 29 on the indicator or flag member 23. Upon closing of the valve by rotating the hand wheel 17 and valve stem 16, the valve stem will provide a winding drum for the flexible member 30 and such member will be wound thereon as shown in Fig. 2 to raise the weight 32 into engagement with the loop 29, and move the indicator or flag member 23 upwardly against the action of tension spring 24 to the position shown in Fig. 2, which will indicate that the valve is in closed condition. Obviously, the eye 28 on the upstanding rod 27 provides a guide for the flexible member 30 and serves to facilitate the even winding thereof on the valve stem 16. As mentioned above, the end 31 of the flexible member 30 should be attached to the hand wheel 17 adjacent the valve stem 16, since this will facilitate winding of the flexible member 30 on the valve stem 16 and of course, if desired, the end 31 of the flexible member 30 could be attached to the valve stem 16 itself in any desired manner.

Upon opening of the valve by rotation of the hand wheel 17 and valve stem 16 in the opposite direction, the flexible member 30 will unwind from the valve stem 16 and move downwardly due to the action of weight 32, and also the indicator or flag member 23 will be pivotally moved downwardly to the horizontal position shown in Fig. 1 by the action of tension spring 24. Obviously, the indicator or flag member 23 will be retained in an intermediate position if the valve is only partially opened or closed, and consequently the indicator of this invention serves to show the exact position of the valve at any given time and does not require any adjustments or manipulation other than the normal opening or closing of the valve.

It will be seen that by this invention there has been provided an extremely simple, yet highly efficient, valve signal indicator which may be conveniently applied to globe or gate type valves without necessitating any alteration or modification of such valves, and which, at a glance, will show the open or closed condition of such valve.

It will be obvious to those skilled in the art that various changes may be made in the invention without departing from the spirit and scope thereof, and therefore the invention is not limited by that which is shown in the drawing and described in the specification, but only as indicated in the appended claims.

What is claimed is:

1. A signal for globe or gate type valves having a rotatable valve stem and a hand wheel, said signal comprising a strap in the form of a split ring to be received around a portion of said valve, ears extending laterally from said strap, fastening means extending through said ears to clamp said strap in position on said valve, a signal flag pivotally mounted adjacent one end on said fastening means, a laterally extending loop secured to said flag adjacent the opposite end thereof, a tension spring connected to said strap and to said flag and urging said flag toward a position substantially in alignment with the plane of said strap, an upstanding rod secured to said strap in substantially parallel relation to said stem and terminating in an eye, a flexible member fixed at one end to said hand wheel and slidably received in said eye and said loop and a weight attached to the opposite end of said flexible member whereby upon rotation of said stem to close said valve said flexible member will be wound on said stem to move said weight into engagement with said loop and pivot said flag against the action of said spring to a position substantially parallel to said stem and upon opening of said valve said flexible member will unwind to permit said spring to return said flag to original position thereby vistually indicating the closed or open position of said valve.

2. A signal for globe or gate type valves having a rotatable valve stem and a hand wheel, said signal comprising a strap in the form of a split ring to be received around a portion of said valve, fastening means to clamp said strap in position on said valve, a signal flag pivotally mounted adjacent one end on said fastening means, a laterally extending loop secured to said flag adjacent the opposite end thereof, a tension spring connected to said strap and to said flag and urging said flag toward a position substantially in alignment with the plane of said strap, an upstanding rod secured to said strap in substantially parallel relation to said stem and terminating in an eye, a flexible member fixed at one end to said hand wheel and slidably received in said eye and said loop and a weight attached to the opposite end of said flexible member whereby upon rotation of said stem to close said valve said flexible member will be wound on said stem to move said weight into engagement with said loop and pivot said flag against the action of said spring to a position substantially parallel to said stem and upon opening of said valve said flexible member will unwind to permit said spring to return said flag to original position thereby visually indicating the closed or open position of said valve.

3. A signal for globe or gate type valves having a rotatable valve stem and a hand wheel, said signal comprising a strap in the form of a split ring to be received around a portion of said valve, fastening means to clamp said strap in position on said valve, a signal flag pivotally mounted adjacent one end on said strap, a loop secured to said flag adjacent the opposite end thereof, a tension spring connected to said strap and to said flag and urging said flag toward a position substantially in alignment with the plane of said strap, an upstanding rod secured to said strap and terminating in an eye, a flexible member fixed at one end to said hand wheel and slidably received in said eye and said loop and a weight attached to the opposite end of said flexible member whereby upon rotation of said stem to close said valve said flexible member will be wound on said stem to move said weight into engagement with said loop and pivot said flag against the action of said spring to a position substantially parallel to said stem and upon opening of said valve said flexible member will unwind to permit said spring to return said flag to original position thereby visually indicating the closed or open position of said valve.

4. A signal for globe or gate type valves having a rotatable valve stem and a hand wheel, said signal comprising a strap in the form of a split ring to be received around a portion of said valve, fastening means to clamp said strap in position on said valve, a signal flag pivotally mounted adjacent one end on said strap, a loop secured to said flag adjacent the opposite end thereof, resilient means connected to said strap and to said flag and urging said flag toward a position substantially in alignment with the plane of said strap, an upstanding rod secured to said strap and terminating in an eye, a flexible member fixed at one end to said hand wheel and slidably received in said eye and said loop and a weight attached to the opposite end of said flexible member whereby upon rotation of said stem to close said valve said flexible member will be wound on said stem to move said weight into engagement with said loop and pivot said flag against the action of said resilient means to a position substantially parallel to said stem and upon opening of said valve said flexible member will unwind to permit said resilient means to return said flag to original position thereby visually indicating the closed or open position of said valve.

5. A signal for valves having a rotatable valve stem and a hand wheel, said signal comprising a strap in the form of a split ring to be received around a portion of said valve, fastening means to clamp said strap in position on said valve, a signal flag pivotally mounted adjacent one end on said strap, a loop secured to said flag adjacent the opposite end thereof, resilient means connected to said strap and to said flag and urging said flag toward a position substantially in alignment with the plane of said strap, an upstanding rod secured to said strap and terminating in an eye, a flexible member fixed at one end to said stem and slidably received in said eye and said loop and a weight attached to the opposite end of said flexible member whereby upon rotation of said stem to close said valve said flexible member will be wound on said stem to move said weight into engagement with said loop and pivot said flag against the action of said resilient means to a position substantially parallel to said stem and upon opening of said valve said flexible member will unwind to permit said resilient means to return said flag to original position thereby visually indicating the closed or open position of said valve.

6. A signal for valves having a rotatable valve stem and a hand wheel, said signal comprising a strap in the form of a split ring to be received around a portion of said valve, fastening means to clamp said strap in position on said valve, a signal flag pivotally mounted adjacent one end on said strap, a loop secured to said flag adjacent the opposite end thereof, resilient means for urging said flag toward a position substantially in alignment with the plane of said strap, guide means secured to said strap, a flexible member fixed at one end to said stem and slidably received in said guide means and said loop and a weight attached to the opposite end of said flexible member whereby upon rotation of said stem to close valve said flexible member will be wound on said stem to move said weight into engagement with said loop and pivot said flag against the action of said resilient means to a position substantially parallel to said stem and upon opening of said valve said flexible member will unwind to permit said resilient means to return said flag to original position thereby visually indicating the closed or open position of said valve.

7. A signal for valves having a rotatable valve stem and a hand wheel, said signal comprising a strap in the form of a split ring to be received around a portion of said valve, fastening means to clamp said strap in position on said valve, a signal flag pivotally mounted adjacent one end on said strap, a loop secured to said flag adjacent the opposite end thereof, resilient means for urging said flag toward a position substantially in alignment with the plane of said strap, a flexible member fixed at one end to said stem and slidably received in said loop and a weight attached to the opposite end of said flexible member whereby upon rotation of said stem to close said valve said flexible member will be wound on said stem to move said weight into engagement with said loop and pivot said flag against the action of said resilient means to a position substantially parallel to said stem and upon opening of said valve said flexible member will unwind to permit said resilient means to return said flag to original position thereby visually indicating the closed or open position of said valve.

No references cited.